US012794871B2

(12) United States Patent
Olivier et al.

(10) Patent No.: US 12,794,871 B2
(45) Date of Patent: Nov. 10, 2026

(54) METHOD FOR CONTROLLING ACCESS TO A GOOD OR SERVICE DISTRIBUTED BY A DATA COMMUNICATION NETWORK

(71) Applicant: HIASECURE, Courbevoie (FR)

(72) Inventors: Arnaud Olivier, Hong-Kong (CN); Philippe Dieudonné, Plaisir (FR)

(73) Assignee: HIASECURE, Courbevoie (FR)

( * ) Notice: Subject to any disclaimer, the term of this patent is extended or adjusted under 35 U.S.C. 154(b) by 204 days.

(21) Appl. No.: 18/554,137

(22) PCT Filed: Apr. 7, 2022

(86) PCT No.: PCT/FR2022/050649
§ 371 (c)(1),
(2) Date: Oct. 5, 2023

(87) PCT Pub. No.: WO2022/214768
PCT Pub. Date: Oct. 13, 2022

(65) Prior Publication Data

US 2024/0205214 A1 Jun. 20, 2024

(30) Foreign Application Priority Data

Apr. 9, 2021 (FR) ........................................ 2103663

(51) Int. Cl.
*H04L 9/40* (2022.01)
*G06K 19/06* (2006.01)
*G06T 1/00* (2006.01)

(52) U.S. Cl.
CPC .... *H04L 63/0807* (2013.01); *G06K 19/06037* (2013.01); *G06T 1/0021* (2013.01); *H04L 63/0861* (2013.01)

(58) Field of Classification Search
CPC ... G06F 21/36; G06F 21/42; G06K 19/06037; G06T 1/0021; H04L 63/0807; H04L 63/0861
See application file for complete search history.

(56) References Cited

U.S. PATENT DOCUMENTS 8,826,399 B2 * 9/2014 Dorso ..................... G06F 21/43 709/228
8,924,712 B2 * 12/2014 Varadarajan .......... H04W 12/06 713/155

(Continued)

OTHER PUBLICATIONS

International Search Report for PCT/FR2022/050649, mailed Jul. 27, 2022, 4 pages.

(Continued)

*Primary Examiner* — Sharon S Lynch
(74) *Attorney, Agent, or Firm* — NIXON & VANDERHYE

(57) ABSTRACT

A method for controlling access to goods or services offered by a platform from an access terminal includes: transmitting an access request from the access terminal to the platform; transmitting a token including information allowing the access request to be identified by the platform from the platform to the access terminal; transmitting the token from the access terminal to an authentication terminal; transmitting the token and an identifier of the user from the authentication terminal to an authentication server; authenticating the user by the authentication terminal; and, should the authentication be successful: transmitting the information allowing the access request to be identified by the platform and the authenticated identity of the user from the authentication server; and a step in which the platform frees access, from the access terminal, to the goods or services requested by the access request.

10 Claims, 3 Drawing Sheets

(56) References Cited

U.S. PATENT DOCUMENTS 9,329,966 B2 * 5/2016 Dugan .................... G06F 11/32
9,792,612 B2 * 10/2017 Dugan ................. G06Q 30/015
9,836,741 B2 * 12/2017 Varadarajan .......... H04W 12/06
10,671,718 B2 * 6/2020 Park ........................ H04L 63/18
10,735,419 B2 * 8/2020 Sabin .................. H04W 12/068
10,742,634 B1 * 8/2020 Shahbazi .............. H04W 12/77
11,196,730 B2 * 12/2021 Eisen .................. H04L 63/0876
11,354,397 B2 * 6/2022 Taylor ..................... G06F 21/36
11,658,961 B2 * 5/2023 Ebrahimi ................ G06F 21/31 713/171
2009/0293110 A1 * 11/2009 Koga ................... G06K 7/1095 709/217
2011/0219427 A1 * 9/2011 Hito .................... H04L 63/0853 726/3
2012/0128267 A1 * 5/2012 Dugan ................. G06Q 30/016 382/321
2012/0131416 A1 * 5/2012 Dugan .................... G06F 11/32 714/760
2013/0071029 A1 * 3/2013 Terwilliger .......... G06K 7/1095 345/443
2013/0124855 A1 * 5/2013 Varadarajan ............ G07F 19/20 726/4
2013/0145446 A1 * 6/2013 Dorso ..................... G06F 21/36 726/6
2014/0246488 A1 * 9/2014 Terwilliger .......... G06K 7/1095 235/375
2014/0317713 A1 * 10/2014 Gadotti ................... G06F 21/36 726/7
2015/0088758 A1 * 3/2015 Varadarajan .......... H04L 9/3234 705/71
2015/0349966 A1 * 12/2015 Dimitrakos ......... H04L 63/0838 713/168
2017/0223002 A1 * 8/2017 Sabin ...................... H04W 4/00
2018/0341763 A1 * 11/2018 Park ........................ G06F 21/42
2020/0092272 A1 * 3/2020 Eisen .................. H04L 63/0869
2021/0056187 A1 * 2/2021 Taylor ................... G06T 19/006
2022/0078178 A1 * 3/2022 Ebrahimi ................ G06F 21/31

OTHER PUBLICATIONS

Written Opinion of the ISA for PCT/FR2022/050649, mailed Jul. 27, 2022, 6 pages.

* cited by examiner

[Fig. 1]
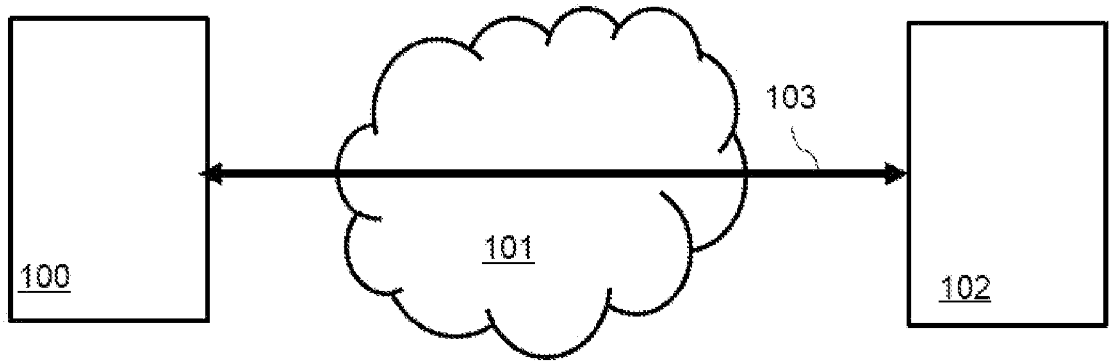
[Fig. 2]
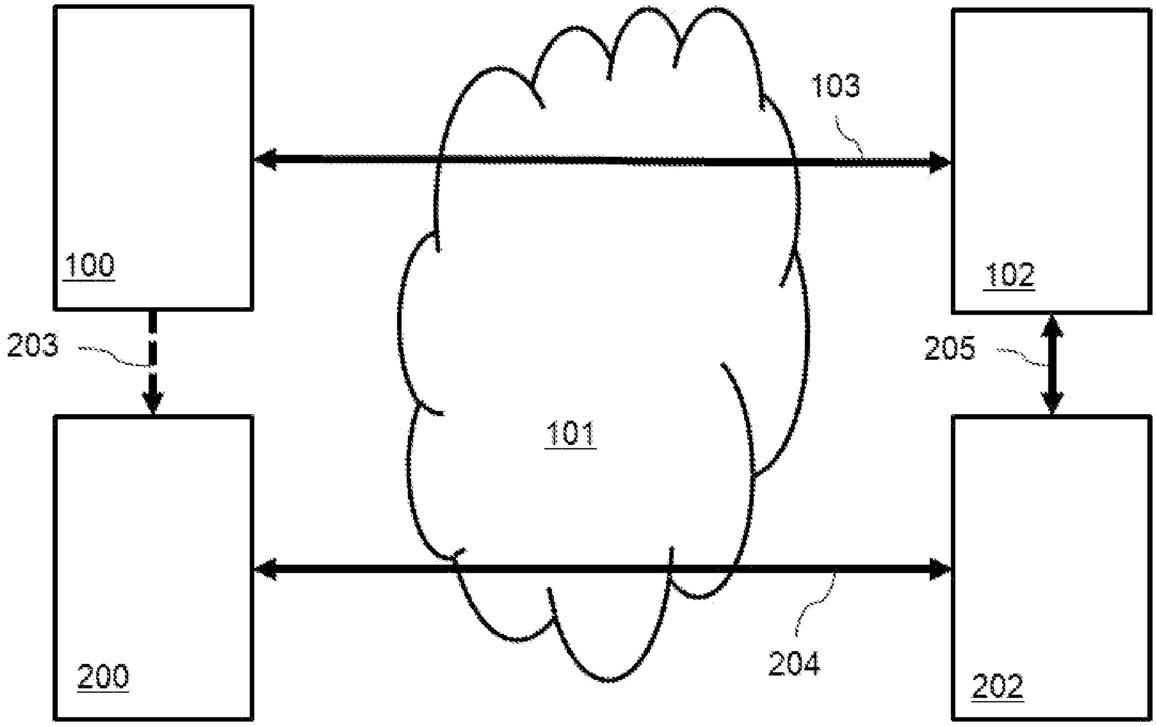

[Fig. 3]
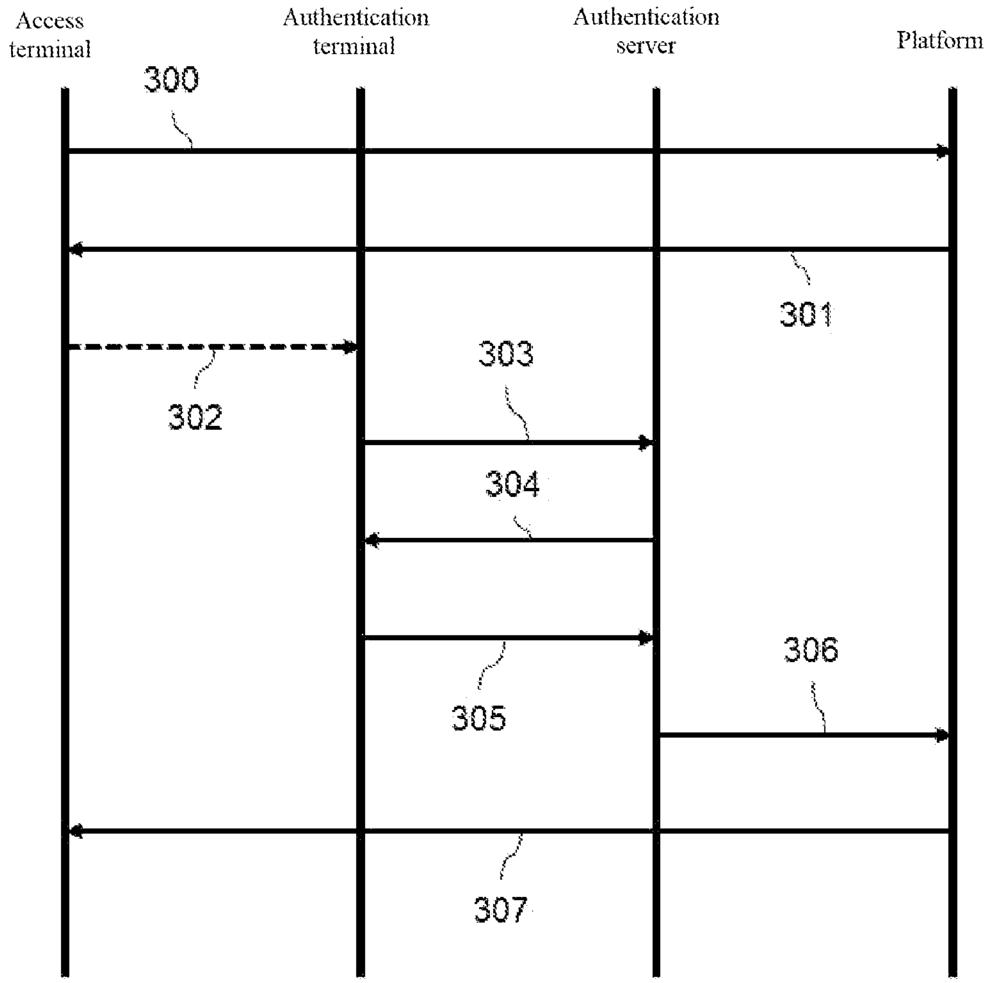

[Fig. 4]
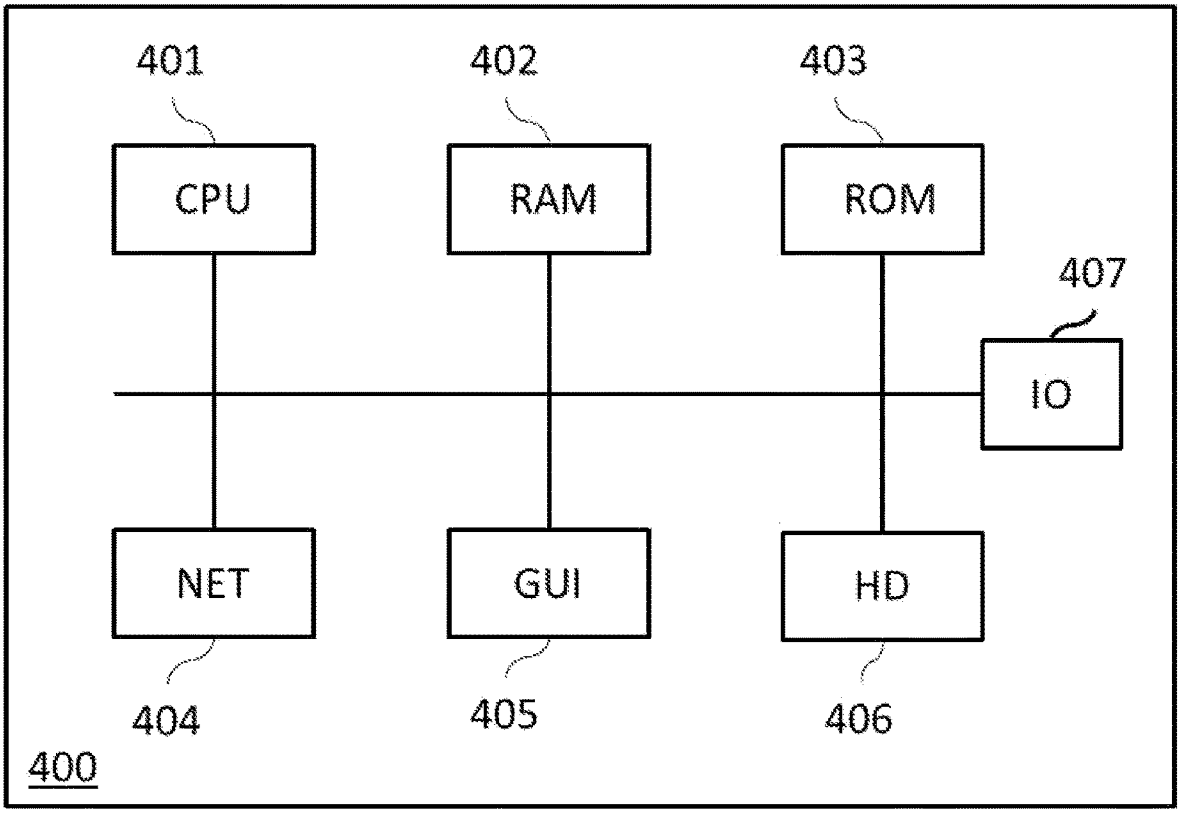

METHOD FOR CONTROLLING ACCESS TO A GOOD OR SERVICE DISTRIBUTED BY A DATA COMMUNICATION NETWORK

This application is the U.S. national phase of International Application No. PCT/FR2022/050649 filed Apr. 7, 2022, which designated the U.S. and claims priority to FR Patent Application No. 2103663 filed Apr. 9, 2021, the entire contents of each of which are hereby incorporated by reference.

The present invention relates to the field of the distribution of goods and services by a data communication network. The invention relates more particularly to controlling access to the service or to the good distributed.

The distribution of goods and services via a data communication network, typically the internet, is constantly developing. More and more goods and services are thus being offered to the user. Several marketing models are being offered, purchase, hire, purchase of access rights or others.

These goods and services are typically offered by a merchant via a service platform, often referred to as an e-commerce platform, connected to the data communication network and made accessible to the users via this network. The user uses a terminal also connected to the data communication network enabling them to connect to and interact with the platform of the merchant. The terminal used by the user is typically a personal computer, a digital tablet, an intelligent telephone (smartphone in English) or any other information processing device that can be connected to the data communication network.

The user wishing to access a good or service offered by an e-commerce platform must typically register with the platform. This registration typically consists in opening an account relating to the user with the platform and of the attribution by the platform of authentication credit to the user to enable them then to authenticate themselves with the platform.

A first family of access control methods consists in encrypting the content offered and providing the user with a hardware device for decryption. This hardware device, typically called a decoder, is associated with a second hardware device containing the decryption keys and the authentication credits of the user. This second hardware device is typically a chip card. Access to the service requires the use of the decoder and of the associated chip card. This first family offers good level of control of the legitimacy of access to the service by the user. However, it limits access to the home of the user where the decoder is installed. This constraint is becoming more and more unsuited to a context where the user typically has several terminals allowing access to the service, these terminals being more and more mobile. A user now expects to be able to access their services more freely, independently of the place of access.

A second family of access control methods enables the user to use any type of terminal connected to the data communication network. The only constraint imposed consists in requiring the user to authenticate themselves from the terminal when they wish to access the service. This authentication is then typically based on entering the password associated with the account of the user. This family of access control methods offers the expected flexibility with regard to the freedom offered to the user to access from any terminal connected to the network and from any place. It does however come up against an inferior level of control. In particular, it is not possible to check that the authentication credits are indeed entered by the legitimate user. The merchants using these access control methods have the greatest difficulty in limiting the sharing of identifiers between users and the fraudulent accesses that result therefrom.

DISCLOSURE OF THE INVENTION

The aim of the present invention is to solve the aforementioned drawbacks by proposing an access control method making it possible to offer flexibility of access with regard to the access terminal and the location thereof while offering better control of legitimacy of access. It is based on the distinction made between the terminal giving access to the service and the authentication terminal. It is also based on a token issued by the platform in response to a request for access to a service. This token is made accessible from the terminal giving access to the service, it is then transmitted to the authentication terminal and returned to the platform with the result of the authentication. It is then possible to offer great flexibility with regard to the access terminal used while benefiting from high security afforded by the authentication terminal. The token makes it possible to make the link between the two.

The invention relates to a method controlling access to a good or service offered by a platform (102) from an access terminal (100), characterised in that it comprises:

a step of transmitting an access request (300) from the access terminal (100) to the platform (102);

a step of storing the access request (300) by the platform;

a step of transmitting (301), from the platform to the access terminal, a token comprising information allowing identification by the platform of the access request (300) stored;

a step of transmitting the token from the access terminal to an authentication terminal (200);

a step of transmitting the token and an identifier of the user from the authentication terminal (200) to an authentication server;

a step of authenticating the user by the authentication terminal;

in the case of success of the authentication:

a step of transmitting information for identifying, by the platform, the access request (300) stored and the authenticated identity of the user from the authentication server (202);

a step (307) of release, by the platform, of the access, from the access terminal (100), to the good or service requested by the access request stored.

According to a particular embodiment, the token is a QR code

According to a particular embodiment, the token is a mark concealed in an image.

According to a particular embodiment, the token is transmitted between the access terminal and the authentication terminal by photographic capture of the token from the authentication terminal.

According to a particular embodiment, the token furthermore comprises information identifying the platform.

According to a particular embodiment, the token furthermore comprises information relating to the access terminal.

According to a particular embodiment, the authentication terminal is previously registered with the authentication server, only one terminal being able to be registered for a given user.

According to a particular embodiment, the authentication server furthermore proceeds with checks relating to the legitimacy of the request stored.

According to a particular embodiment, the step of authenticating the user includes the verification of a biometric characteristic of this user.

According to a particular embodiment, the token is transmitted with the authenticated identity of the user from the authentication server to the platform.

The invention relates to a computer program comprising instructions adapted to the implementation of each of the steps of the method according to the invention when said program is executed on a computer.

The invention relates to an information storage means, removable or not, partially or totally readable by a computer or a microprocessor including code instructions of a computer program for executing each of the steps of the method according to the invention.

Other specific features and advantages of the invention will also become apparent in the following description.

BRIEF DESCRIPTION OF THE DRAWINGS

Other features, details and advantages of the invention will emerge from the reading of the following detailed description. The latter is purely illustrative and must be read with regard to the accompanying drawings, on which:

FIG. 1 illustrates a known system for distributing goods and/or services via a data communication network;

FIG. 2 illustrates a system for distributing goods and/or services according to an embodiment of the invention;

FIG. 3 illustrates exchanges during access to a good or service in accordance with one embodiment of the invention;

FIG. 4 is a schematic block diagram of an information processing device for implementing one or more embodiments of the invention.

DETAILED DESCRIPTION

FIG. 1 illustrates a known system for distributing goods and/or services via a data communication network.

In this system, a client 100 is connected to a data communication network 101, typically the internet. A platform 102, also connected to the data communication network 101, offers goods or services. The user can access a good or service offered by the platform 102 from the client 100. This access is done by means of exchanges 103 between the client 100 and the platform 102.

In the client 100 is typically software for access to the service, such as for example a web browser operating on an access terminal connected to the network 101. The access terminal may be a personal computer, a digital tablet, a mobile smartphone or any other information processing device that can connect to the network.

The platform 102 is a set of software operating on one or more computer servers. We shall speak here of the platform to designate all the services offered by a merchant to users independently of the hardware implementation of the server or servers enabling the software to operate. The platform can operate on a single server or a set of servers that can be located at various geographical points. These servers can communicate with each other to offer the service.

The platform 102 typically incorporates several functions. Apart from the offer and distribution of goods and services strictly speaking, the platform also typically manages a database of the users registered with the platform, the authentication thereof, and the rights associated with each user. The platform may be a platform for the purchase of goods online, for distributing services such as for example video on demand services, the hire of films, music broadcasting, etc.

A user connecting to the platform for the first time is typically offered a registration procedure. This registration procedure consists in creating an account for the user and attributing to them authentication credits to enable them to authenticate themselves with the platform. This registration may be subject to a purchase or be done free of charge depending on the distribution model adopted by the platform. Once the registration has been done, the platform possesses an account relating to the user that records information relating to this user. It may be a case of bank information, of rights relating to their registration, of authentication data and of any information necessary to the platform to offer its service to the user.

Once registered, the user wishing to access a good or service offered by the platform must connect thereto from the client that is running on the terminal. This client may typically be an internet browser, such as Safari (registered trade mark), Chrome (registered trade mark), Edge (registered trade mark) or other. The client may also be an application dedicated to access to the platform. To do this, it must typically authenticate itself with the platform. Any type of authentication can then be used. The most usual authentication method consists in providing a pair of identifiers composed of a user identifier, often designated by the English word login, and an associated password.

Authentication may be requested at each connection or only from time to time. The identity of the user then being saved by the client. Once authenticated, the user can access the platform and select a product or service. A request for a product or service is then sent by the client to the platform. The latter typically checks the legitimacy of the request, i.e. it checks that the user has the rights for accessing the product or service requested. This check may include a check on the geographical location of the client, for example when the product or service is legally available only in some parts of the world. This may be the case for audiovisual services where the rights associated with a work may be geographically limited. According to the type of product or service offered, any type of check may be necessary. A payment may also be necessary to obtain the product or service requested.

Once these checks have been done and any payment made, the user can obtain the good or service requested. For example, in the case of a video on demand service, the audiovisual programme requested may be broadcast by the platform to the client of the terminal of the user from where the request was sent.

This access control method offers the flexibility of access from any terminal, at the home or outside the home, for the user. When the latter wishes to access the platform from a new terminal, it suffices for them to authenticate themselves with the platform from the client available on the terminal. Simple knowledge of the authentication credits, here an identifier and a password, allows access to the platform by profiting from the rights associated with the user.

However, the access control is not always sufficient. In particular, a user may forget to disconnect from the client of a terminal belonging to another person who will then be able to access the platform by means of the identity of the user. Another problem may be posed, more particularly relating to the services offered by subscription such as services of broadcasting audiovisual programmes on demand, this is the sharing of authentication credits. A user takes out a subscription to a platform and obtains the authentication credits associated with his account. Next, they distribute these authentication credits to a set of other persons. The latter can then benefit from the subscription taken out by the user by means of their authentication credits, fraudulently accessing the service offered by the platform. The authentication credits may also be stolen from the legitimate user.

It is at the present time difficult to combat these fraudulent accesses, except by restricting the flexibility of access enabling a legitimate user to connect from any place and any terminal to the services to which they have subscribed.

The invention aims to solve this problem by proposing a method for controlling access to an online platform making it possible to offer flexibility of access to the services offered from any terminal while limiting the risks of fraudulent access by a user other than the legitimate user.

FIG. 2 illustrates an architecture for distributing goods or services from a platform according to an embodiment of the invention.

This figure illustrates the terminal 100 for access to the platform 102 via the data communication network 101. The access terminal 100 exchanges messages 103 with the platform 102. The same architecture is found here as the one illustrated by FIG. 1.

One of the aspects of the invention consists in distinguishing the terminal 100 for access to the platform from the authentication terminal 200. It is thus possible to offer great flexibility to the user with regard to the choice of the access terminal 100 while imposing constraints with regard to the choice of the authentication terminal 200. Typically, according to one embodiment of the invention, the authentication terminal 200 is a unique terminal, linked to the user. It may be a case for example of their smartphone, a digital tablet or other.

A second aspect of the invention consists in distinguishing the platform 102 offering the goods or services from the authentication server 202 responsible for authenticating the users. The authentication server 202 is spoken of here independently of its particular implementation that may involve one or more connected servers, co-located or not, offering the user authentication service.

When it is said that the access terminal and the authentication terminal are distinguished, this distinction is functional and in no way prohibits embodiments where the access terminal and the authentication terminal are one and the same terminal. Similarly, the distinction made between the service platform and the authentication server is also functional and does not prohibit embodiments where these two services are implemented on one and the same server or the same set of servers.

The authentication of the user is done by the latter from the authentication terminal 200. For this purpose, the user uses an authentication client operating on the terminal 200. This client may be a generic client such as a web browser, or preferentially a dedicated authentication application offered by the service provider of the authentication server 202. Any authentication protocol can be used here, from simple identifier and password to more secure ones that can use the verification of a biometric characteristic of this user for example. In the example embodiment, an authentication of the challenge response type is used, the user using a secret convention that is particular to them to determine the response to the challenge offered by the authentication server. Such a method is described in the French patent application published under the number FR3074321. Authentication involves a connection from the authentication terminal 200 with the authentication server 202 via the communication link 204. Advantageously, the authentication terminal is previously registered with the authentication server, and it is not possible for a given user to register only a single authentication terminal.

Because the supply of a good or service to an access terminal 100 by a platform 102 has been distinguished from the authentication of the user requesting the good or service made between the authentication terminal 200 and the authentication server 202, it is necessary for a link to be established between the request from the user and their authentication.

According to a third aspect of the invention, when the platform 102 receives a request from an access terminal, it generates a token and transmits it to the access terminal 100. The user transfers this token to the authentication terminal 200. This transfer, referenced 203, can take any form. It may be a case of an electronic transmission via a connection between the two terminals of the wireless type in accordance, for example, with the Bluetooth (registered trade mark) protocol or the Wi-Fi (registered trade mark) protocol. It may also be a case of information displayed on the screen of the access terminal 100 that the user copies onto the authentication terminal 200. In one embodiment of the invention, the token transmitted by the platform is displayed on the screen of the access terminal 100 and photographed from the authentication terminal 200. The token may, in this embodiment, take the form of a two-dimensional code of the QR code type or a mark concealed in an image in accordance with a method known by the English name watermarking. The token, or at least the information contained in the token, is then transmitted by the authentication terminal to the authentication server during exchanges implementing this authentication.

Next, when the authentication succeeds, the authentication server 202 is in a position to transmit to the platform the verified identity of the user and the token, or the information contained in the token, to the platform 102. The platform 102 having available the identity of the user and the token is then in a position to authorise the distribution, or the transmission, of the good or service requested by the user. The nature of this distribution or transmission depends on the nature of the good or service requested by the user. It may be a case of a transmission to the access terminal, for example in the case of a digital book or an audiovisual work purchased by the user. It may also be a case of the distribution without storage, streaming in English, of an audiovisual work. It may even be a case of the dispatch of a physical good, without connection with the access terminal, which will have served only for the purchase, when the request from the user relates to a material good.

The token must contain at least one item of information enabling the platform to directly identify: the pending request received from the access terminal and which gave rise to the generation of the token, indirectly: finding or calculating identifying information on the pending request from the access terminal. It may be a case of an identifier of this request that is typically stored by the platform while awaiting the authentication. This identifier is then typically generated by the platform when the request is stored. In an alternative embodiment, it may be a case of an identifier of the access terminal that sent the request, the platform then seeks, among the requests stored, the one that comes from this access terminal. In general terms, it may be a case of any data enabling the platform to identify the request, directly or indirectly.

In certain embodiments of the invention, the platform may proceed with additional checks when the identity of the user and the token are received. These checks may relate to the rights related to the user, or to time ranges of use of the good or service. They may also relate to the characteristics of the access terminal, these characteristics being able to be technical characteristics such as the size of the screen, the power of the processor or others, or characteristics related to the geographical location of the access terminal, since the rights of access to certain goods or service may be limited geographically, but also characteristics related to the context of the access terminal such as the presence of an acoustic high fidelity system that can be used in the vicinity or the presence of an electronic or digital component, such as for example a secure element or digital safe, accessible and usable from the access terminal.

Some of these checks relating to the legitimacy of the pending request may be made by the authentication server in some embodiments of the invention. It is then possible for the platform to transmit certain necessary information in the token. This information may for example contain information on the capacities of the access terminal, its location or its network environment.

Access to the good or service may be conditional on a payment by the user. This payment may be managed by the platform on receipt of the authenticated identity of the user in collaboration with a payment platform and/or the bank associated with the account of the user. The payment will then be confirmed by the user from the access terminal.

The payment may also be managed by the authentication server. For example, the platform, on receipt of the identity of the user and the token, informs the authentication server of the need for a payment. The server then proceeds with the management of the payment, which will be confirmed by the user from the authentication terminal, this payment being able for example to credit in real time an account of the platform, and linking this payment to the token issued by said platform will allow release of the service identified by the token. The information necessary for the payment can be stored by the authentication server or supplied by the platform for each operation.

The authentication server can be associated with a given platform. However, in some embodiments, the authentication server allows authentication of a user of a plurality of platforms. In this case, it is necessary for the authentication server receiving an authentication request associated with a token to be able to identify the platform concerned to transmit to it the result of the authentication and the associated token. To do this, the platform can include a platform identifier in the information on the token. This identifier can take the form of the internet address of the platform, of an identifier previously agreed between the platform and the authentication server or of any information enabling the authentication server to identify the platform.

Thus, the information enables the user to benefit from access to the platform from any access terminal and in any place. On the other hand, by constraining the authentication from a single authentication terminal previously registered with the authentication server, the risk of a user other than the legitimate user being able to proceed with authentication is greatly reduced. The authentication terminal is typically, but not limitatively, a smartphone of the user. Authentication therefore requires physical access to this telephone. Distributing their authentication credits to a circle of friends, for example, is no longer possible. It is therefore possible, by virtue of the invention, to preserve flexibility of choice of the access client to a platform while very greatly limiting the possibilities of fraudulent access by an illegitimate user.

FIG. 3 illustrates the exchanges occurring during access to a good or service in an example embodiment of the invention.

A user wishing to access a good or service offered by a platform from an access terminal causes the sending of an access request 300 from this access terminal to the platform.

The platform receives this request 300 and stores it. This request is then pending. Advantageously, information on the access terminal is stored in or with the request received. This information can be transmitted by the access terminal with the request. For example, if the request is made using the HTTP protocol (Hyper Text Transfer Protocol in English), a header of the HTTP request typically contains a signature of the access terminal and of the client sending the request. The platform generates a token and transmits this token in the form of a response 301 to the request 300. As discussed above, this token contains at least one item of information that will enable the platform to identify the pending request 300 subsequently. The token can also contain information for identifying the platform or any supplementary information such as information on the access terminal.

Once the token 301 has been received by the access terminal, this token must be transmitted, 302, by the user to their authentication terminal. This transmission can take any form. It may be a case of a transmission using a cable or wireless transmission protocol between the access terminal and the authentication terminal. It may also be a case of a photographic capture of an element such as a QR code or an invisible marking, the token then being displayed on the screen of the access terminal. It may also be a case of the manual copying of information, such as a character string, displayed on the screen of the access terminal.

Once the token has been transmitted to the authentication terminal, the authentication of the user takes place from their authentication terminal. The particular exchanges are here dependent on the authentication protocol used, which may here be any known authentication protocol. In the example of use, the authentication terminal transmits the token and the identifier of the user in an authentication request 303 to the authentication server. The authentication server in response generates and transmits a challenge 304 to the authentication terminal. The user then uses the secret convention to produce the response to the challenge and to transmit it, 305, to the authentication server.

The authentication server proceeds with the authentication and, in the case of success, transmits the authenticated identity of the user and the token received to the platform in the form of the message 306. In some embodiments, the authentication server may proceed with additional checks as described above. These checks may require the interpretation and use of additional information contained in the token. It may also be necessary for the authentication server to obtain an identifier of the platform contained in the token to identify the platform when there are several of them. In some embodiments, the information contained in the token that is useful only to the authentication server is not transmitted to the platform. Only the information enabling the platform to identify the pending request is required in addition to the authenticated identity of the user.

When the platform receives the authenticated identity of the user and the information identifying the pending request, it can release, by a message 307, access to the good or to the service requested in the pending request at the access terminal. In an alternative implementation, the authentication server can, on the basis of session or context information already resident and dated in the authentication terminal, not proceed with a new authentication of the user and directly transmit the authenticated identity previously obtained from the user to the platform.

These exchanges between the access terminal, the authentication terminal, the authentication server and the platform can use any transmission protocol. In one embodiment, the HTTP protocol is used.

FIG. 4 is a schematic block diagram of an information processing device 400 for implementing one or more embodiments of the invention. The information processing device 400 may be a peripheral such as a microcomputer, a workstation or a mobile telecommunication terminal. The device 400 includes a communication bus connected to:

- a central processing unit 401, such as a microprocessor, denoted CPU;
- a random access memory 402, denoted RAM, for storing the executable code of the method implementing the invention as well as the registers adapted to register variables and parameters necessary for implementing the method according to embodiments of the invention; the memory capacity of the device may be supplemented by an optional RAM memory connected to an extension port for example;
- a read only memory 403, denoted ROM, for storing computer programs for implementing embodiments of the invention;
- a network interface 404 is normally connected to a communication network over which digital data to be processed are transmitted or received. The network interface 404 may be a single network interface, or composed of a set of different network interfaces (for example cable and wireless interfaces or various types of cable or wireless interface). Data packets are sent over the network interface for transmission or are read from the network interface for reception under the control of the software application executed in the processor 401;
- a user interface 405 for receiving inputs from a user or for displaying information to a user;
- a storage device 406 as described in the invention and denoted HD;
- an input/output module 407 for receiving/sending data from/to external peripherals such as hard disk, removable storage medium or others.

The executable code can be stored in a read only memory 403, on the storage device 406 or on a digital removable medium such as for example a disk. According to a variant, the executable code of the programs can be received by means of a communication network, via the network interface 404, in order to be stored in one of the storage means of the communication device 400, such as the storage device 406, before being executed.

The central processing unit 401 is adapted to control and direct the execution of the instructions or of the software code portions of the program or programs according to one of the embodiments of the invention, instructions that are stored in one of the aforementioned storage means. After a powering up, the CPU 401 is capable of executing instructions from the main RAM memory 402, relating to a software application. Such software, when it is executed by the processor 401, causes the implementation of the methods described.

In this embodiment, the apparatus is a programmable apparatus that uses software for implementing the invention. However, secondarily, the present invention may be implemented in the hardware (for example in the form of a specific integrated circuit or ASIC).

Naturally, to satisfy specific requirements, a person competent in the field of the invention will be able to apply modifications to the above description.

Although the present invention has been described above with reference to specific embodiments, the present invention is not limited to these specific embodiments, and the modifications that lie within the field of application of the present invention will be obvious for a person skilled in the art.

The invention claimed is:

1. A method for controlling access to a good or service offered by a platform from an access terminal, the method comprising:

- a step of transmitting an access request from the access terminal to the platform;
- a step of transmitting, from the platform to the access terminal, a token comprising information allowing identification by the platform of the access request, wherein the token is a quick response (QR) code or a watermark concealed within an image;
- a step of transmitting the token from the access terminal to an authentication terminal;
- a step of transmitting the token and an identifier of the user from the authentication terminal to an authentication server with which the authentication terminal previously registered, wherein only one authentication terminal is able to be registered for a user with the authentication server;
- a step of authenticating an identity of the user by the authentication terminal using at least one authentication method including verification of a biometric characteristic of the user, the at least one authentication method comprising an authentication of a type of challenge response issued in response to a challenge, the challenge being transmitted by the authentication server to the authentication terminal in response to the authentication server receiving the token and identifier from the authentication terminal, the challenge response being produced by the user;
- in case of successfully authenticating the identity of the user:
  - a step of transmitting the token with the authenticated identity of the user and information for identifying, by the platform, the access request from the authentication server to the platform; and
  - a step of release, by the platform, of the access, from the access terminal, to the good or service requested by the access request.

2. The method according to claim 1, wherein the token is transmitted between the access terminal and the authentication terminal by photographic capture of the token displayed on the access terminal by the authentication terminal.

3. The method according to claim 1, wherein the token furthermore comprises information identifying the platform.

4. The method according to claim 1, wherein the token furthermore comprises information relating to the access terminal.

5. The method according to claim 1, wherein the authentication server furthermore proceeds with checks relating to the legitimacy of the request stored.

6. A non-transitory computer-readable medium on which are stored code instructions that, when executed by a computer or microprocessor, cause the computer or microprocessor to control access to a good or service offered by a platform from an access terminal to a user, executing each of:

- a step of transmitting an access request from the access terminal to the platform;
- a step of transmitting, from the platform to the access terminal, a token comprising information allowing identification by the platform of the access request, wherein the token is a quick response (QR) code or a watermark concealed within an image;

a step of transmitting the token from the access terminal to an authentication terminal;

a step of transmitting the token and an identifier of the user from the authentication terminal to an authentication server with which the authentication terminal previously registered, wherein only one authentication terminal is able to be registered for a user with the authentication server;

a step of authenticating an identity of the user by the authentication terminal using at least one authentication method including verification of a biometric characteristic of the user, the at least one authentication method comprising an authentication of a type of challenge response issued in response to a challenge, the challenge being transmitted by the authentication server to the authentication terminal, the challenge response being produced by the user;

in case of successfully authenticating the identity of the user:

a step of transmitting the token with the authenticated identity of the user and information for identifying, by the platform, the access request from the authentication server to the platform;

a step of release, by the platform, of the access, from the access terminal, to the good or service requested by the access request.

7. The non-transitory computer-readable medium of claim 6, wherein the token is transmitted between the access terminal and the authentication terminal by photographic capture of the token displayed on the access terminal by the authentication terminal.

8. The non-transitory computer-readable medium of claim 6, wherein the token furthermore comprises information identifying the platform.

9. The non-transitory computer-readable medium of claim 6, wherein the token furthermore comprises information relating to the access terminal.

10. The non-transitory computer-readable medium of claim 6, wherein the authentication server furthermore proceeds with checks relating to the legitimacy of the request stored.

* * * * *